Feb. 11, 1930.　　　J. A. MALM　　　1,746,544
INERTIA TRANSMISSION DEVICE
Filed Feb. 12, 1927

Inventor
John A. Malm.
By A. J. O'Brien
Attorney

Patented Feb. 11, 1930

1,746,544

UNITED STATES PATENT OFFICE

JOHN A. MALM, OF DENVER, COLORADO

INERTIA TRANSMISSION DEVICE

Application filed February 12, 1927. Serial No. 167,732.

This invention relates to improvements in devices for transmitting energy and relates more particularly to that type of transmission devices which employs an inertia member that serves to automatically vary the transmission ratio.

It is customary to provide automobiles with an internal combustion engine, which is coupled to the drive wheels by means of shafts and gears. Under ordinary conditions of road and speed the engine rotation bears a certain ratio to the speed of the drive wheels. When steep hills are encountered or when heavy loads are transported, the transmission ratio must be changed and for this purpose various types of transmission gear sets have been invented which, however, must be manually shifted.

It is evident that the ideal conditions would be attained if the engine or motor could operate at the most efficient speed under all conditions of road and load and at the same time the transmission ratio be automatically varied so as to deliver to the drive wheels the requisite torque for propelling the vehicle at the maximum speed.

It is the object of this invention to produce an automatic inertia transmission mechanism that will automatically vary the transmission ratio in accordance with the load, or the torque required, in such a manner that the engine or driving motor may maintain a constant speed under all conditions.

My invention can be best described and will be most readily understood when reference is had to the accompanying drawing in which the preferred embodiment thereof has been illustrated and in which.

Figure 1:
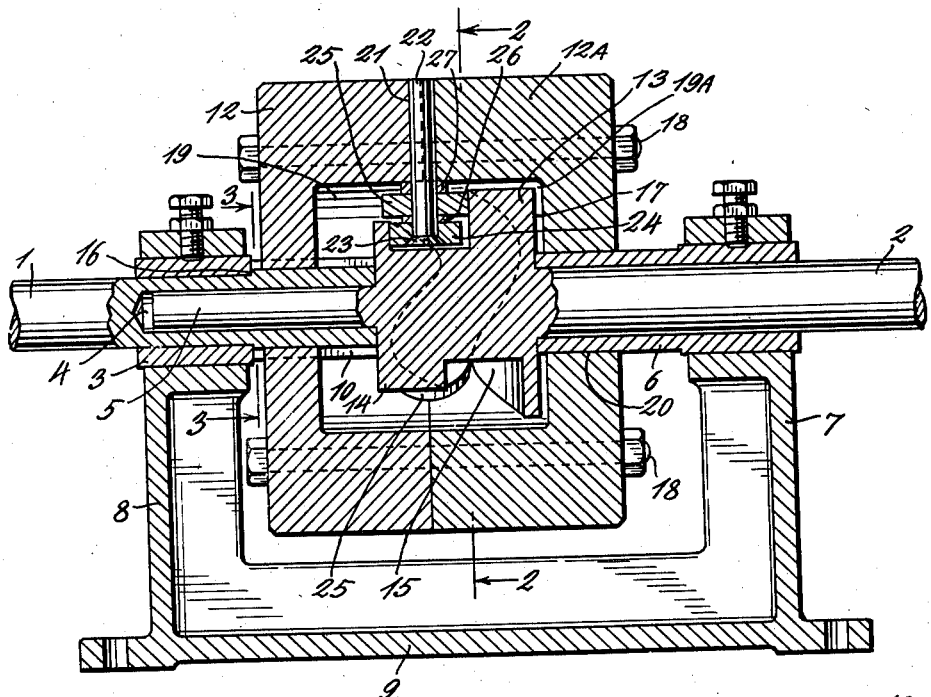
Fig. 1 is a longitudinal section of my improved device.
Figure 3:
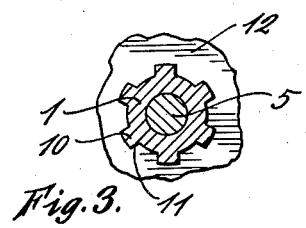
Fig. 3 is a section taken on line 3—3, Fig. 1.
Figure 2:
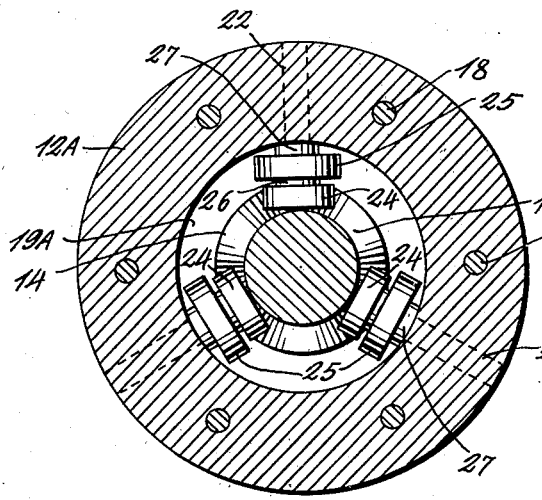
Fig. 2 is a transverse section taken on line 2—2, Fig. 1.

Numeral 1 designates the drive shaft and 2 the driven shaft. Under certain conditions, however, shaft 2 may be employed as the drive shaft and 1 as the driven shaft. For the purpose of this description shaft 1 will be considered as the drive shaft and may be part of the crank shaft of an internal combustion engine. It will be observed that shaft 1 is mounted for rotation in a bearing 3 and that it has an axial opening 4 within which is rotatably journalled the reduced end 5 of the driven shaft 2. Shaft 2 is mounted for rotation in an elongated bearing 6, one end of which is secured in an opening in the standard 7, which, together with the corresponding standard 8 projects upwardly from the base 9. The base 9 and standards 7 and 8 are illustrative of a supporting means only and are intended merely to illustrate one means for supporting the bearings 3 and 6 in alignment.

Shaft 1 is provided with a plurality of parallel longitudinally extending splines 10, which coact with grooves 11 in a flywheel 12, whose construction and function will be hereinafter described in detail.

Shaft 2 has formed integral therewith a cam member comprising parts 13 and 14 which are cylindrical and of different diameters. In the illustration, part 13 is of a larger diameter than part 14, but this relationship may be reversed, if desired. A cam groove 15 separates the parts 13 and 14. This groove may have as many nodes as may be desired, but in the example shown it has six nodes. The extension 5 is integral with and projects axially from the cam portion of shaft 2. It will be observed that shaft 1 has a shoulder 16 which abuts the end of the bearing 3 and that the bearing 6 has its end in abutment with the radial side 17 of the cam portion 13. The shafts 1 and 2 can therefore rotate with respect to each other, but are held against relative longitudinal movement.

A fly wheel comprising the two parts 12 and 12A is held together by means of clamping bolts 18, so as to form a unitary device. Each of the parts 12 and 12A has a cylindrical recess 19 and 19A, which, together form a cylindrical chamber. The part 12A has a central opening 20 of the proper size to receive the inner end of the bearing 6. Since part 12 is splined to the shaft 1, it can slide but not rotate with respect to this shaft, while part 12 is free to both rotate and slide on the bearing 6. In order to interconnect the flywheel and the cam I have provided the former with three radial holes 21, which, in the embodiment shown, have their center lines, or axes, in the plane of contact between parts 12 and 12A. Pins 22 are located in the openings 21 and are provided on their inner ends with heads 23. These pins each carry two rollers 24 and 25. Rollers 24 are nearer the center than rollers 25 and are spaced from the latter by means of a washer 26. Similar washers or spacers 27 separate the rollers 25 from the inner cylindrical surface of the central chamber. The width of the cam groove is equal to the radius of roller 24 plus the radius of the roller 25 and rollers 24 are made to contact with the wall formed by part 13, while rollers 25 contact with the wall formed by the part 14.

In the drawing I have shown three sets of rollers that are spaced 120 degrees apart and which occupy corresponding positions in the cam groove. In order, however, to simplify the explanation, we shall assume that there is only one pin 22 and one set of rollers. The cam groove 15 is shaped so as to conform as nearly as practicable to a parabola as this is best for smooth running, but any other suitable shape may be employed.

Let us now assume an extreme case in which the shaft 1 is being rotated and in which shaft 2 is free to rotate, and further, that the friction between shaft 2 and bearing 6 is equal to the friction between the extension 5 and the shaft 1. The fly wheel, which is splined to shaft 1 will, of course, rotate at the same speed as the drive shaft. It is evident that there can be no relative rotation between shafts 1 and 2 without a reciprocation of the fly wheel on shaft 1. The inertia of the fly wheel naturally opposes any force that tends to reciprocate it and therefore the entire assembly will rotate at the same angular speed and all points of the fly wheel will rotate in stationary transverse planes.

We will now assume another extreme case in which shaft 1 is rotated at a given speed by a powerful motor and that shaft 2 is clamped so that it cannot rotate. The fly wheel must, of course, rotate at the same speed as shaft 1, because it is splined to the latter. Since shaft 2 is stationary, the fly wheel will have to reciprocate because the rollers 24 and 25 are constrained to follow the cam groove 15, which in the embodiment shown has six nodes. During each revolution of shaft 1 the fly wheel will move three times in one direction and three times in the other direction. I will not attempt to give a mathematical exposition of the values of the various forces, but will base this explanation on elementary physical laws that are well understood. The basis of this invention is Newton's first law of motion which reads as follows:

"Every body continues in its state of rest or uniform motion in a straight line except in so far as it may be compelled by impressed force to change that state."

The force which causes the fly wheel to reciprocate is produced by the interaction of the rollers 24 and 25 with the sides of the cam groove. Since the groove is curved the force between the sides of the groove and the rollers can be resolved into two components, one of which acts in the direction of the axis of the shaft 2 and the other of which acts in a plane perpendicular to this axis; the former component serves to reciprocate the fly wheel and the other tends to produce a torque for rotating the shaft 2. By varying the mass of the fly wheel or the angularity of the groove 15, the forces can be increased or decreased to any extent desired.

We will now consider a case in which the shaft 2 is rotatable, but in which it opposes a considerable and a variable resistance to rotation. Let us assume that shaft 2 is provided with a friction brake and that its resistance to rotation is gradually increased. As soon as the shaft 2 offers any appreciable resistance to relative rotation, it begins to lag behind shaft 1 and therefore produces relative rotation between the cam and the fly wheel, which, as above explained, causes the fly wheel to reciprocate at such a rate that a torque reaction is produced that is just sufficient to overcome the resistance offered by shaft 2. If the resistance to rotation is small the relative rotation of shafts 1 and 2 will also be small and therefore the rate at which the fly wheel reciprocates will be low. As the resistance to the rotation of shaft 2 is increased, the fly wheel has to be reciprocated at a higher rate in order to develop the required torque reaction and therefore the speed of shaft 2 will have to decrease with respect to shaft 1 until the limiting case is reached in which shaft 2 is standing still.

From the above it will be apparent that transmission ratio will be automatically varied so as to produce just sufficient torque reaction to rotate the shaft 2. If we consider a case in which shaft 1 is part of the crank shaft of an internal combustion engine and that shaft 2 is connected to the drive wheels of an automobile, the speed of the automobile, with a constant speed of the engine, will automatically change with the grade of the road. When the road is flat and smooth the speed will be the maximum and as the grade increases the speed of the car will decrease so that the torque required to rotate the shaft 2 multiplied by the angular speed of the shaft will equal the energy delivered by the motor minus the losses in the transmission device.

Let us now consider a case in which an automobile is descending a hill. If the hill is only moderately steep, the engine may be left running but slowed down as much as possible. Shaft 2 will now tend to rotate faster than shaft 1 and as its speed increases beyond that of shaft 1, the fly wheel will begin to reciprocate and thereby produce a retarding force which serves as a brake. On very steep hills the engine may be stopped and the fly wheel thereby held against rotation. When the engine is stationary, shaft 2 can only rotate by reciprocating the fly wheel whose inertia effect will produce a force that will oppose such rotation. It is therefore possible to descend the steepest grades without danger of the automobile attaining excessive speeds. As the braking effect is produced without any appreciable amount of friction, there will be little or no heat developed and therefore there will be no danger of burning out the parts, as when the usual friction brakes are employed.

Since the parts 12 and 12A are nonrotatably secured to the drive shaft, they take the place of the fly wheel ordinarily employed.

The central chamber of the fly wheel may be partially filled with lubricating oil which will keep all of the parts thoroughly lubricated.

I want to call particular attention to the fact that this transmission has no pistons which must have a liquid or air tight fit, no valves and no relatively movable parts that must be provided with packed joints as in hydraulic transmissions.

In the drawing I have shown the cam groove formed in the enlarged end of the driven shaft and the rollers that cooperate with the groove carried by the fly wheel. It is evident that the operation will be exactly the same if the cam groove is formed in the inner surface of the fly wheel and the pin and rollers carried by the shaft. I therefore want it understood that I consider that such a reversal is merely the mechanical equivalent of the one shown and that I can employ either form without departing from the invention claimed.

It is well known that the moment of inertia of a mass is a direct function of the square of the velocity and therefore since my device depends for its effectiveness on the fact that a heavy mass must be repeatedly accelerated in opposite directions, the forces developed will vary as the square of the rate of reciprocations. When the rate increases excessively for some reason the strains developed may become too large for safety.

Figure 4:
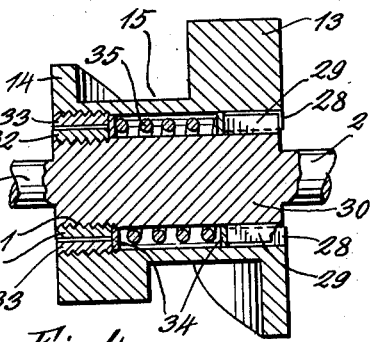
Fig. 4 is a sectional view showing a slightly modified construction.

In Fig. 4 I have shown how the cam member instead of being made integral with shaft 2, as in Fig. 1 may be made of a separate piece which has a central opening provided at one end with inwardly extending splines 28, that interlock with outwardly projecting splines 29 on the enlarged cylindrical portion 30. The other end of the part 30 is provided with threads 31 with which the circular nut 32 cooperates. An externally threaded ring 33 has a threaded connection with one end of the cam member. Washers 34 lie next to the adjacent ends of the splines and nuts. A helical coil spring 35 is partially compressed and is located between the washers 34 and therefore exerts a force tending to move the washers apart. When the washers contact with both the splines 29 and the nut 32, the cam is in normal position. If a force is applied to the cam which tends to move it longitudinally, this may overcome the force of the spring and cause the cam to be displaced along the axis of the cylindrical part 30. Since the force for reciprocating the fly wheel is transmitted by the sides of the cam groove to the rollers 24 and 25, it is evident that if this force exceeds that which is being exerted by the spring, the cam will move axially and thereby shorten the stroke of the reciprocations. This will reduce the velocity, and since the forces vary with the square of the velocity will greatly reduce the forces.

When the construction shown in Fig. 4 is employed, the relative speed and power of the driving and driven shafts can be obtained by properly proportioning the strength of the spring to the speed and the weight of the fly wheel. The resiliently mounted cam construction shown in Fig. 4 also acts as a means for limiting the power that can be transmitted at a given speed for when the longitudinal component of the forces acting on the rollers attain a given value the spring will be compressed and the torque thereby limited.

I want to call particular attention to the relationship of the rollers 24 and 25 to the sides of the cam groove. These rollers contact with the opposite sides of the groove and by making one side wall lower than the other, I can make the side walls perpendicular to the axis of rotation instead of inclined. This construction permits me to employ rollers of different diameters by making the width of the groove equal to the sum of the radii of the rollers. By having the radial elements of the sides of the grooves perpendicular to the axis of rotation the cost of manufacture can be reduced. While the device has been described as used in connection with automobiles, it can be used for any other purpose where power is to be transmitted from one shaft to another.

When this device is employed with automobiles, it is not necessary to locate it in the same position as the present transmission gears, but a separate one may be used for each drive wheel and in this way the present differential can be dispensed with for the speed of the driving wheels would be automatically regulated by this device.

When this device is used for driving an automobile, a suitable reversing gear may be employed in connection with the differential.

Having now described my invention what is claimed as new is:

1. An inertia transmission comprising two axially aligned relatively rotatable shafts, a fly wheel slidably but nonrotatably secured to one of said shafts and means comprising a member having an endless cam groove nonrotatably connected with the other shaft for connecting said fly wheel to the other shaft in such a manner that the fly wheel will be reciprocated when the shafts rotate relative to each other.

2. An inertia transmission comprising two axially aligned relatively rotatable shafts, a fly wheel slidably but nonrotatably secured to one of said shafts and means comprising a cam and a cam engaging member for so interconnecting the flywheel and the other shaft that the flywheel will be reciprocated when the shafts rotate relative to each other.

3. An inertia transmission device comprising two relatively rotatable shafts, a fly wheel slidably but nonrotatably secured to one of said shafts and means comprising a cam and cam engaging pin for reciprocating the flywheel when the shafts rotate relative to each other.

4. An inertia transmission device comprising two relatively rotatable shafts, a fly wheel slidably but nonrotatably secured to one of said shafts and means for reciprocating the fly wheel when the shafts rotate relative to each other, said means comprising a member having a cam groove, said member being nonrotatably connected with the other shaft and a cam engaging pin connected with the flywheel and projecting into the groove.

5. An inertia transmission mechanism comprising two axially aligned relatively rotatable shafts, one of which is a drive shaft and the other of which is a driven shaft, a fly wheel slidably but nonrotatably secured to one of said shafts and means interconnecting the fly wheel and the other shaft, said means comprising a pin carried by one of said parts and engaging a cam groove formed in the other part.

6. An inertia transmission mechanism comprising, in combination, axially aligned driving and driven shafts, a fly wheel mounted for rotation about the common axis of said shafts, means for causing the fly wheel to rotate when one of the shafts is rotated, means for causing said fly wheel to reciprocate in the direction of its axis of rotation when the shafts rotate relative to each other and means for reducing the amplitude of the reciprocations of the flywheel when a predetermined amount of power is transmitted at a predetemined speed.

7. An inertia transmission mechanism comprising, in combination, two relatively rotatable shafts, one of which is a drive shaft and the other of which is a driven shaft, means for holding said shafts in alignment, means for holding said shafts against relative longitudinal movement, a fly wheel splined to one of said shafts so as to be longitudinally movable thereon, and a cam and pin carried by the fly wheel and the other shaft for reciprocating the fly wheel when the shafts rotate relative to each other.

8. An inertia transmission mechanism comprising, in combination, two relatively rotatable shafts, one of which is a drive shaft rotatable shafts, one of which is a drive shaft and the other of which is a driven shaft, means for holding said shafts in alignment, means for holding said shafts against relative longitudinal movement, a fly wheel splined to one of said shafts so as to be longitudnally movable thereon, said fly wheel having a central cylindrical chamber having a radial pin, the other shaft having its end portion provided with a cam member having a cam groove in its outer surface, said enlarged end being located within the opening in the fly wheel and a pin secured to the fly wheel, and having its inner end extending into said groove.

9. An inertia transmission mechanism comprising two axially aligned shafts, a fly wheel nonrotatably but slidably secured to one shaft, a cam member nonrotatably but slidably secured to the other shaft, resilient means comprising a spring for normally holding the cam member in normal position and means for interconnecting the cam and fly wheel so that the latter will be reciprocated when the shafts rotate relative to each other.

10. An inertia transmission mechanism comprising two axially aligned relatively rotatable shafts, means for holding the shafts against relative axial movement, a hollow fly wheel splined to one of the shafts so as to be longitudinally movable thereon, a cam member splined to the other shaft so as to be longitudinally movable thereon, means comprising a spring for normally holding the cam in a position intermediate its limits of movement, said cam having a cam groove in its outer surface and a pin carried by the fly wheel and engaging said groove.

11. An inertia transmission comprising two axially aligned relatively rotatable shafts, one of which is driven and the other a driving shaft, an inertia member slidably but nonrotatably secured to one of said shafts, means for reciprocating the inertia member when the shafts rotate relative to each other and means for automatically decreasing the amplitude of the reciprocations when the torque necessary to rotate the driven shafts exceeds a predetermined value.

12. An inertia transmission comprising two axially aligned relatively rotatable shafts, one of which is a driven and the other a driving shaft, an inertia member slidably but nonrotatably secured to one of said shafts, means for reciprocating the inertia member when the shafts rotate relative to each other and means comprising a cam member held in a predetermined position by a spring, but adapted to move against the compression of the spring when sufficient force is applied thereto for automatically decreasing the amplitude of the reciprocations of the inertia member when the torque required to rotate the driven shaft exceeds a predetermined value.

In testimony whereof I affix my signature.

JOHN A. MALM.